United States Patent

Bueler

[11] 3,887,046
[45] June 3, 1975

[54] QUICK INSTALLATION VEHICLE WHEEL SENSOR

[75] Inventor: Richard C. Bueler, Des Peres, Mo.

[73] Assignee: Wagner Electric Corporation, Parsippany, N.J.

[22] Filed: May 17, 1974

[21] Appl. No.: 470,947

[52] U.S. Cl............................. 188/181 A; 310/168
[51] Int. Cl................................................. B60t 8/00
[58] Field of Search ...... 303/21 F, 21 CG; 188/181; 310/68 R, 68 B, 68 E, 168; 324/160, 166, 163

[56] References Cited
UNITED STATES PATENTS

| | | | |
|---|---|---|---|
| 3,500,091 | 3/1970 | Jones | 310/168 |
| 3,604,966 | 9/1971 | Liggett | 310/168 |
| 3,703,946 | 11/1972 | Ondrasik | 310/168 X |
| 3,772,550 | 11/1973 | Anselmino | 310/168 |
| 3,812,391 | 5/1974 | Johnson et al. | 310/168 |
| 3,829,166 | 8/1974 | Menar et al. | 303/21 CG |

FOREIGN PATENTS OR APPLICATIONS

| | | | |
|---|---|---|---|
| 974,492 | 1/1961 | Germany | 310/168 |

Primary Examiner—Trygve M. Blix
Assistant Examiner—Douglas C. Butler

[57] ABSTRACT

A vehicle wheel brake antilock assembly comprises a sensor. The sensor includes a stator and a rotor for generating a varying electrical signal. The stator has a generally annular stator mounting ring. The stator mounting ring includes protruding members for mounting the ring on an axle in a predetermined radial orientation. Also, the assembly includes an insert mounted on and extending into the axle for receiving the stator mounting ring. An electrical connector is resiliently mounted on the ring and a connector is also mounted on the insert. An anchoring member is provided to anchor the connectors in relative electrical and mechanical connection. The stator ring can then be mounted on the insert in predetermined radial orientation therewith for electrically and mechanically connecting the ring and the insert and for securing the stator ring for limited relative movement with respect to the rotor.

6 Claims, 12 Drawing Figures 3,887,046

QUICK INSTALLATION VEHICLE WHEEL SENSOR

CROSS-REFERENCE TO RELATED APPLICATIONS

This invention relates generally to the sensor assembly disclosed in application Ser. No. 363,604 filed on May 24, 1973 by Donald R. Stigall and Richard C. Bueler entitled "Vehicle Wheel Speed Sensor" and assigned to the assignee of the present invention.

BACKGROUND OF THE INVENTION

1. Field Of The Invention

This invention relates generally to fluid pressure brake and analogous systems and more specifically to those of the inertia control type including brake system control by plural cooperating sensing means producing a single signal.

2. Description Of The Prior Art

In the past, there have been various types of electrical sensors for monitoring vehicle wheel speed in antilock brake systems to detect an incipient wheel-skid situation. For instance, U.S. Pat. No. 3,500,091 discloses a sensor which is mounted on the inboard side of a vehicle wheel, and the sensor includes an annular electrical coil positioned adjacent both an annular magnet and a pole piece which are arranged concentrically with each other. While this sensor has certain advantages, it is subjected to dirt, slush and other foreign particles which may be splashed or thrown thereon from the roadbed.

U.S. Pat. No. 3,473,120 discloses a sensor for a vehicle antilock brake system mounted in a wheel bearing lubrication chamber on the outboard side of the vehicle wheel, and the sensor rotor is mounted on the hub cap assembly while the sensor stator is housed generally within the bore of a hollow axle. While this sensor has certain advantages, the mounting of its stator within the hollow axle serves to either appreciably reduce the number of stator teeth or the size thereof, to either limit the number of flux paths or reduce the size of the cumulative flux paths, to reduce the strength of the output signal of the sensor, or to make the stator-rotor gap more critical. U.S. Pat. Nos. 2,798,976, 3,480,812 and 2,462,761 each show signal generating devices and illustrate various arrangements of the rotor and stator thereof.

More recently, it may be noted that there has been provided a sensor having a high signal output wherein the tolerance or gap between the sensor rotor and stator are not critical. Such sensors have magnet means mechanically maintained in intimate contact with the sensor pole pieces wherein the tolerance gap between the sensor stator and rotor, if small at one location while greater at another location, is averaged due to the use of a plurality of individual flux paths which serve to minimize extraneous modulation. In such sensors the stator thereof has identical pole pieces and the component parts of the stator are all referenced and self-aligning. The sensor is operable in the environment of a lubricant for the vehicle wheel bearing and may be cooperably mounted on vehicle hub caps and on the bearing retaining nut which are staple articles with only a minimum of alteration thereof. Also, such sensors have a varying reluctance path providing means stamped from sheet metal and formed annularly wherein the thickness thereof is substantially constant.

In the above-described sensors there is no provision for quick installation on the assembly line. As a result, time consuming electrical and mechanical connections are required during installation of the sensor.

SUMMARY OF THE INVENTION

Accordingly, the present invention provides a sensor for quick installation to accomplish required mechanical and electrical connections. The foregoing is accomplished by a novel sensor assembly. The sensor is mounted on an axle adjacent at least one of the vehicle wheels. The sensor has a rotor and a stator and includes a generally annular stator mounting ring carrying a first portion of a varying electrical signal generating means, including a coil, in cooperation with a second portion of the varying electrical signal generating means carried by the rotor. Means are formed on the stator mounting ring for mounting on the axle in a predetermined radial orientation. Means are mounted on the axle for receiving the ring. Electrical connectors are mounted in the means for receiving the ring for connecting the coil to an antilock logic system. Means are included to anchor the electrical connectors in relative electrical connection. Also, means are provided to resiliently interconnect the ring and the electrical connectors.

The above and further novel features of the invention will appear more fully from the following detailed description when read in connection with the accompanying drawings.

BRIEF DESCRIPTION OF THE DRAWINGS

In the drawings wherein like parts are marked alike.

DESCRIPTION OF THE PREFERRED EMBODIMENT

Figure 1:
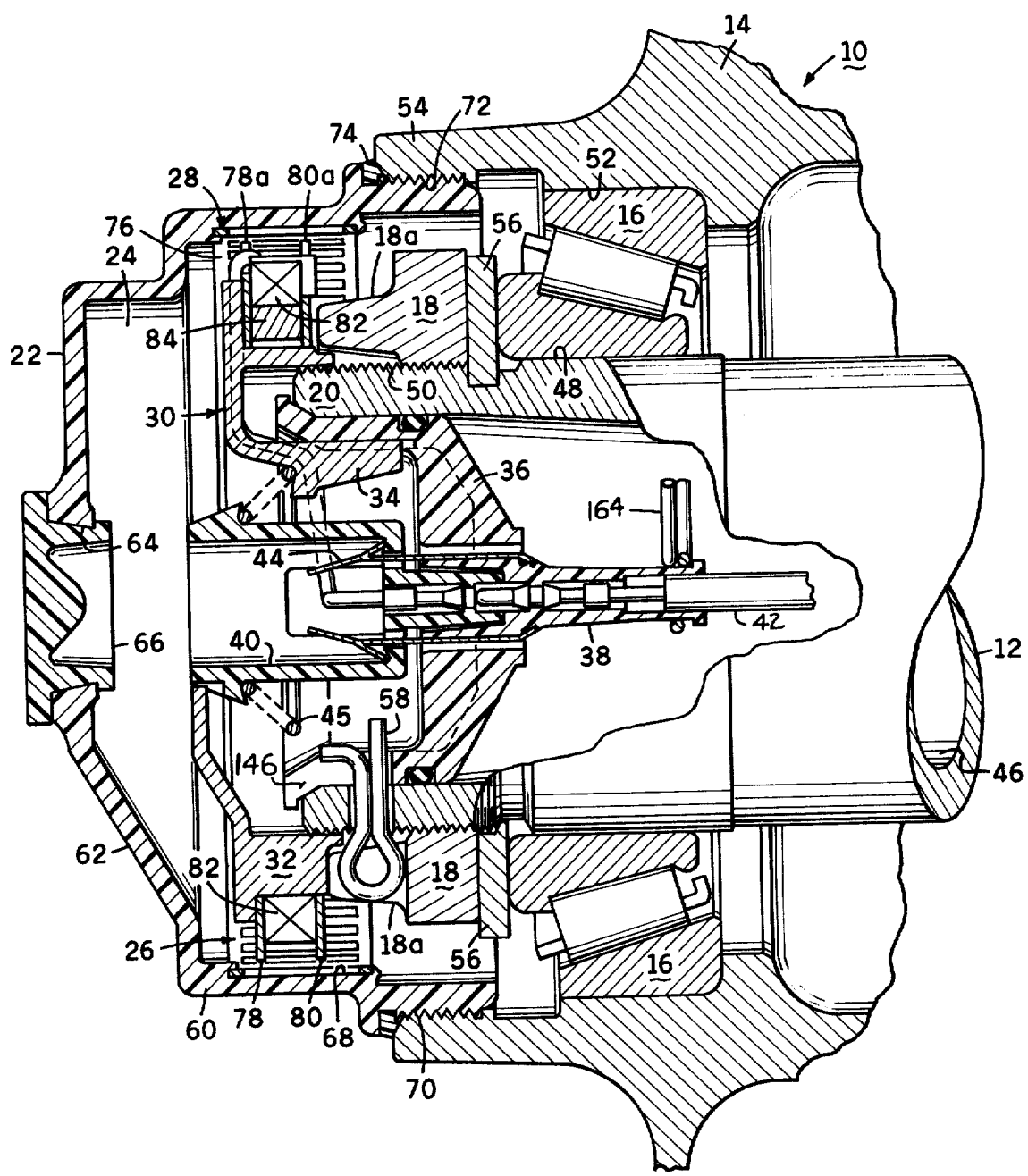
FIG. 1 is a partial cross-sectional side elevation of the novel sensor assembly of this invention.

Referring now to the drawings, FIG. 1 illustrates the novel antilock sensor assembly of this invention generally designated 10. Generally cylindrical hollow axle 12 has vehicle wheel 14 rotatably mounted thereon. Wheel bearing 16 is disposed between wheel 14 and axle 12, and wheel bearing retaining nut 18 is threadedly received on a free end portion 20 of the axle for retaining the bearing in place. Hub cap 22 is threadedly engaged with wheel 14 enclosing lubricating chamber 24 which holds lubricant for bearing 16. An electrical sensor is generally shown at 26 as a means for generating a varying electrical signal to control actuation of the logic portion of a vehicle antilock brake system or the like (not shown), and includes a rotor 28 which comprises a hub cap 22 and associated component parts, as described hereinafter, and stator 30 adjacent nut 18 which also retains in place bearing 16, as previously mentioned. Stator 30 has a generally annular stator mounting ring 32 carrying a first portion of the means generating the varying electrical signal. Rotor 28 carries a second portion of the means generating the signal. Ring 32 includes protruding members 34 for mounting the ring on the axle in a predetermined radial orientation. Also, the assembly includes an insert 36 mounted on and extending into axle 12 for receiving ring 32 and for accommodating electrical connection with the logic system. Ring 32 can then be mounted on insert 36 in a predetermined radial orientation therewith for electrically connecting sensor 26 with the logic system and for securing stator ring 32 for limited relative movement with respect to the rotor. Means such as first and second electrical connectors, 38, 40, respectively, are mounted in insert 36 for providing electrical connection between sensor 26 and the logic system via cable 42. Connectors 38, 40 are anchored in relative electrical connection by anchor means 44. Resilient member or compression spring 45 resiliently interconnects ring 32 and insert 36 via the electrical connectors 38, 40.

More particularly, axle 12 is hollow, having an axially extending bore 46 which opens into the free end portion 20 of the axle, and a peripheral surface 48 of axle 12 is threaded at 50. Antifriction or wheel bearing 16, of a type well known in the art, is rotatably positioned in engagement between axle peripheral surface 48 and a cooperating annular surface 52 of wheel hub 54. Bearing retaining nut 18 is threadedly received on threaded portion 50 and engaged with a spacer washer or shim 56 to maintain the bearing in place. The interferring engagement of a cotter key 58 between axle 12, insert 36 and adjacent nut extensions 18a maintains nut 18 in its assembled position on axle threads 50 and maintains insert 36 within axle 12 from leftward movement, as shown in FIG. 1.

Hub cap 22, which is a type well known in the art and formed of either a nonferrous metal or a plastic, is generally cup shaped having an annular sidewall 60 integratedly formed with base wall 62. A lubricant filler hole 64 is centrally provided in the base wall in which an insertable sealing plug 66 is received. Axially extending bore 68 is provided in hub cap sidewall 60 as discussed hereinafter, and peripheral threads 70 are provided on sidewall 60 for threaded engagement with cooperating thread 72 provided in the leftward or open end of wheel hub 54. An O-ring type seal 74 is carried on hub cap sidewall 60 in sealing engagement with wheel hub 54 to seal lubrication chamber 24.

Sensor 26 is provided with stator portion 30 comprising annular stator mounting ring 32 of nonferrous metal or other nonmagentic or a synthetic material. Ring 32 is provided to carry a first portion of the means generating the varying electrical signal which comprises identical annular and generally planar pole pieces 78, 80 which are stamped from flat steel stock and have a plurality of predeterminately circumferentially spaced teeth 78a, 80a, respectively, on the outer circumferential surface of pole pieces 78, 80. The first portion also includes annular coil 82 interposed about ring 32 to space the pole pieces 78, 80 and a plurality of permanent magnets 84 are disposed in generally circumferentially extending spaces provided on ring 32, the magnets being in end-to-end relationship. As well known in the art, magnets 84 are disposed with all of their north and south poles respectively adjacent to pole pieces 78, 80 to provide like polarity therein.

Rotor 28 carries a second portion of the means generating the varying electrical signal and comprises hub cap 22, previously described, which carries ferrous ladder or track 76 stamped from substantially planar ferrous metal sheets. Ladder 76 is annularly mounted in bore 68 of hub cap 22 thus comprising the rotor portion 28 of sensor 26. The foregoing having generally described the interrelation of the elemental portions of this invention, the following will provide a more detailed description of those elemental portions.

Stator Mounting Ring

Figure 2:
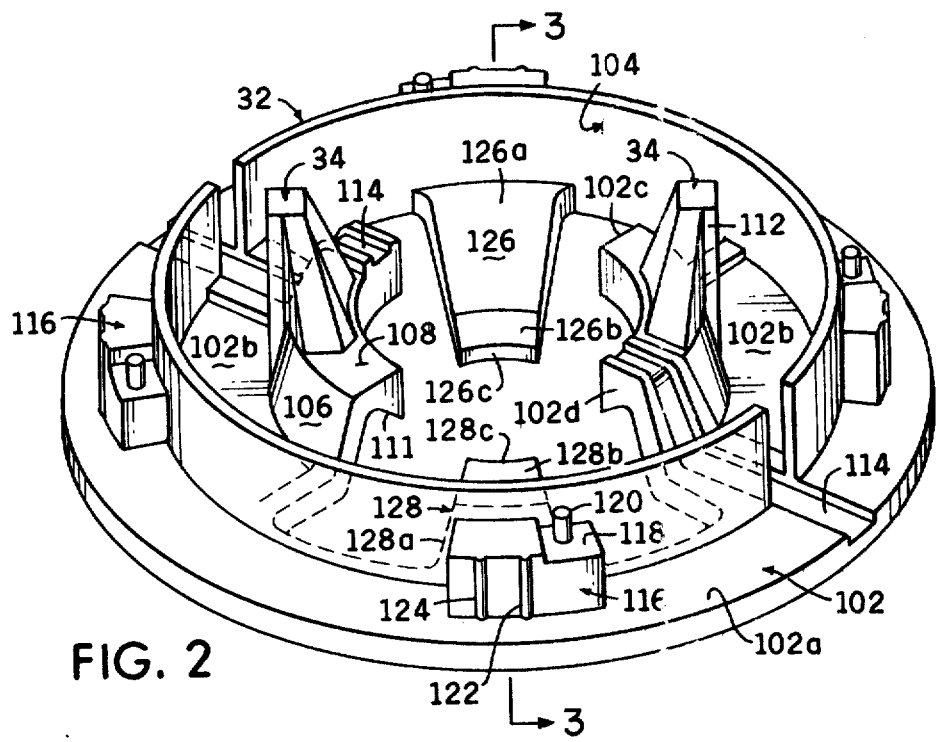
FIG. 2 is an isometric view of the stator mounting ring.
Figure 3:
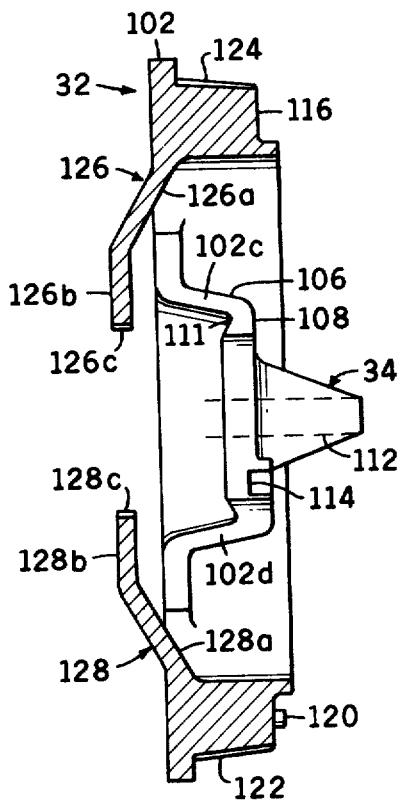
FIG. 3 is a cross-sectional side elevation taken along line 3—3 of FIG. 2.

Stator mounting ring 32, see FIGS. 2 and 3, is generally annular in configuration and preferably comprises a cast nonferrous metal or other nonmagnetic or a synthetic material. Ring 32 generally comprises a main radial portion 102 integratedly formed with main axially extending portion 104. Radial portion 102 includes first or outboard portion 102a which extends radially outwardly from axial portion 104, and second or inboard portions 102b which extend radially inwardly from axial portion 104 as best seen in FIG. 2. However, it is shown that whereas outboard portion 102a is a continuous radial portion, inboard portions 102b are segmented radial portions terminating at ends 102c and 102d.

Inboard portions 102b are integratedly formed to include incline 106 terminating in a land portion 108. Protruding from the incline and land portions 106, 108, respectively, of inboard portions 102b are protrusions 34 appropriately formed to include a keyed portion 112 for mounting ring 32 in a predetermined radial orientation on axle 12. Segmented annular lip portions 111 are formed under land 108 at the point of intersection between land 108 and incline 106 as shown in the drawings. Also integratedly formed with inboard portions 102b are canal-like impressions 114 provided to guide electrical conduit from coil 82 to the electrical connectors to be discussed later in greater detail. Canals 114 extend from land 108 along incline 106 and across outboard and inboard portions 102b, 102a, respectively interrupting axially extending portion 104.

Integratedly formed with outboard portion 102a and axially extending portion 104 are a plurality of generally keystone shaped positioning or locating bosses 116. Bosses 116 are stepped to form locating surface 118 and include locating nipples or hubs 120. Radially extending positioning or locating ribs or extensions 122, 124 are provided on the peripheral surfaces of bosses 116. As described in the related disclosure and as can be seen in FIG. 1, magnets 84, coil 82 and pole pieces 78, 80 are accommodated and carried by the ring 32 including bosses 116 and the radial and axial portions 102, 104, respectively.

Extensions 126, 128 are integratedly formed with ring 32 and extend from axially extending portion 104 at inclined portion 126a, 128a, respectively and continue into radial lands 126b, 128b, respectively. Extensions 126, 128 terminate at 126c, 128c, respectively.

Insert And First Electrical Connector

Figure 4:
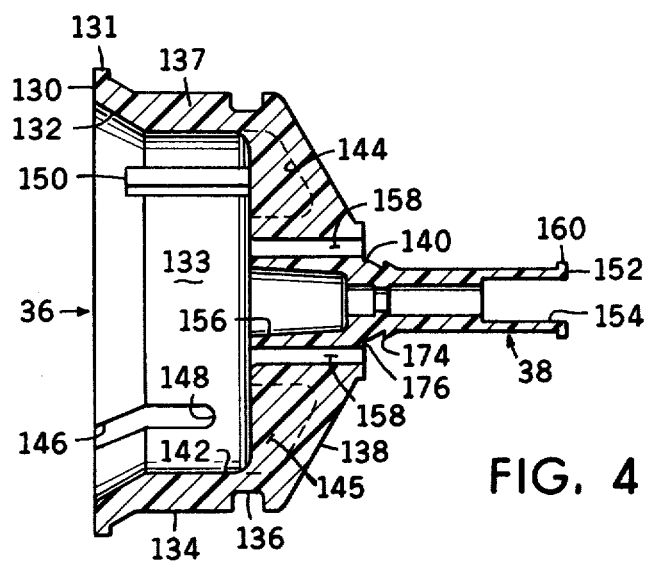
FIG. 4 is a cross-sectional side elevation of the insert and first electrical connector of this invention.
Figure 5:
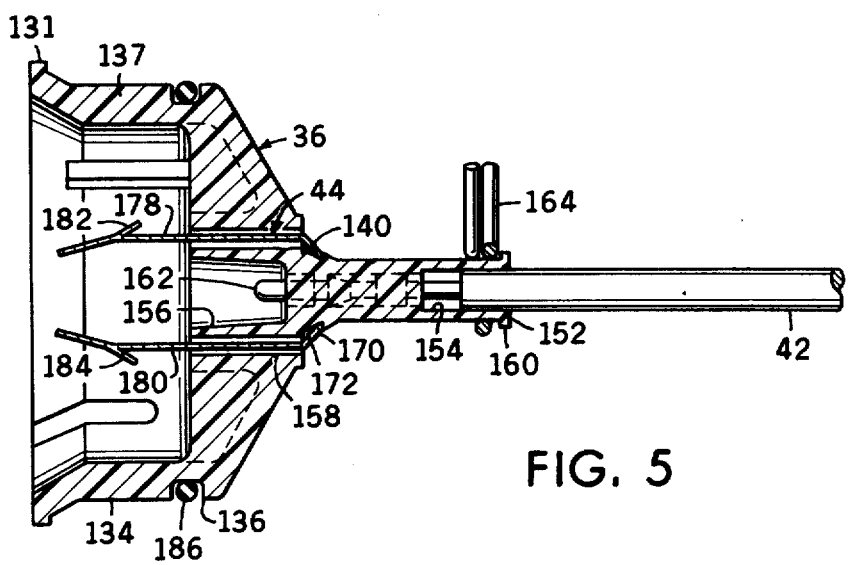
FIG. 5 is a cross-sectional side elevation of the insert of FIG. 4 having electrical connection made therewith.

Insert 36 and first electrical connector portion 38, FIGS. 4 and 5, are integratedly formed as a unitary piece but could be formed as separate units and then assembled. It is preferred that insert 36 and connector portion 38 are formed from a suitable synthetic such as a plastic material. FIG. 4 illustrates a cross-sectional side elevation of insert 36 which is generally cylindrical and includes annular sidewall 137 having first end 130 including a chamfered type opening 132 extending into the insert 36 to form annular receptacle 133. Outer peripheral surface 134 of sidewall 137 is annular and includes annular O-ring groove 136. Surface 134 terminates adjacent first end 130 at flange 131. Nappe shaped second end 138 necks down to a point 140 where insert 36 and first electrical connector portion 38 thereof intersect. Notches 174, 176 are formed in connector portion 38 adjacent point 140. Opening 132 extends within insert 36 and is bounded by inner annular surface 142 of sidewall 137 which terminates at a base wall portion 144 reinforced at rib 145. Slot 146 is formed in insert 36 and extends from first end 130 toward base wall 144 terminating at 148. Keyways 150 are formed in inner annular surface 142. First electrical connector portion 38 extends rightwardly as shown in FIG. 4 and terminates at extensions 152. Stepped side-by-side conduit receptacles 154 are formed in and extend through connector portion 38 terminating at and opening into connector receptacle 156 which in turn terminates at and opens into receptacle 133. Slots 158 extend through base wall 144 from second end 138 to terminate at and open into receptacle 133. Flange 160 is provided adjacent extensions 152.

Figure 6:
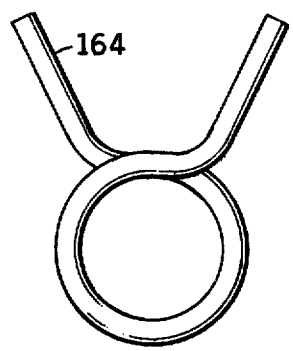
FIG. 6 is a side elevation of a clamp used in this invention.
Figure 8:
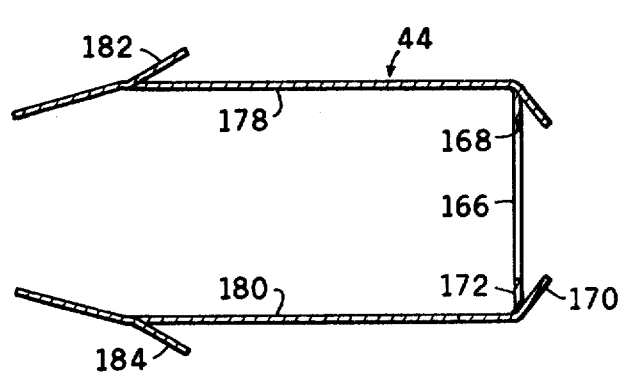
FIG. 8 is a cross-sectional side elevation of the anchor of FIG. 7.
Figure 7:
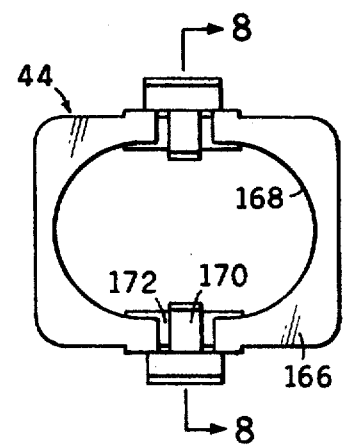
FIG. 7 is an end view of the anchor means of this invention.

Electrical conduit or cable 42, FIG. 5, is electrically connected to the logic system (not shown) and terminates in well known terminals 162 which extend through conduit receptacles 154 into connector receptacle 156. Clamp 164, FIG. 6, preferably steel, engages extensions 152 adjacent flange 160 to retain cable 42 in position. Anchor or retaining clip 44, FIGS. 5, 7 and 8, preferably spring steel, is positioned on insert 36 so that base portion 166 including opening 168 accommodates first connector portion 38 adjacent point 140. Flanges 170, 172 of clip 44 engage and are retained in position by notches 174, 176, respectively of connector portion 38. Clip extensions 178, 180 extend through slots 158 and include hooks 182, 184, respectively. O-ring 186 is located in groove 136.

Second Electrical Connector

Figure 9:
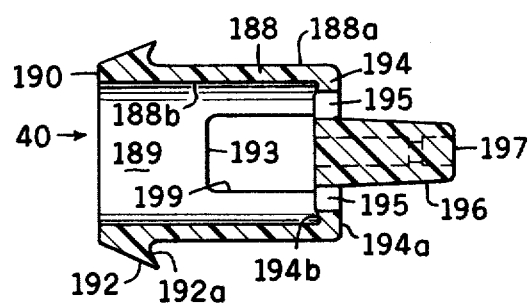
FIG. 9 is a cross-sectional side elevation of the second electrical connector of this invention.
Figure 10:
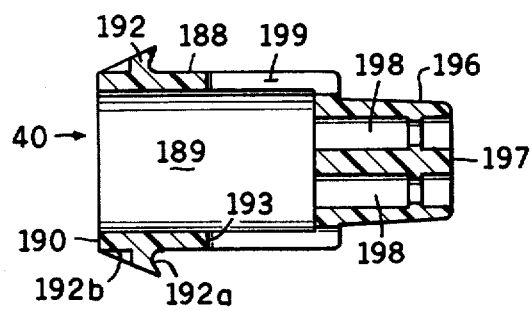
FIG. 10 is a cross-sectional side elevation of the second connector taken substantially at 90° to the view of FIG. 9.

Second electrical connector 40, FIGS. 9 and 10, is generally cylindrical and includes annular sidewall 188 having outer surface 188a and inner surface 188b. First end 190 of sidewall 188 includes annular retainer flange 192 having an annular lip portion 192a and detents 192b. Connector 40 is preferably formed of a suitable synthetic such as a plastic material. Inner surface 188b terminates at base wall 194 having outer base portion 194a and inner base portion 194b. Extension 196 extends rightwardly from base wall 194 in the drawings and terminates at extension base 197 and includes side-by-side conduit receptacles 198 which extend through extension 196 from extension base 197 to terminate at and open into annular receptacle 189 formed by inner surface 188b and inner base portion 194b. Slots 195 are formed in base wall 194 and extend therethrough from outer base portion 194a terminating at and opening into receptacle 189. Slots 199 are formed in sidewall 188 and extend from basewall 194 to a point designated 193 between the first and second ends thus interconnecting outer surface 188a and inner surface 188b.

Figure 11:
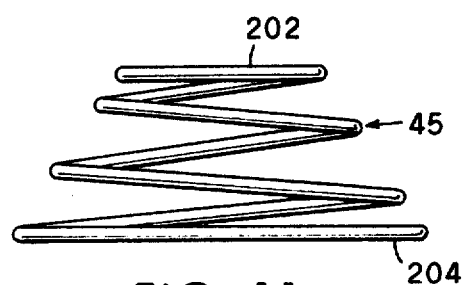
FIG. 11 is a side elevation of a compression spring used in this invention.

Resilient member or compression spring 45, FIG. 11, is preferably of hard drawn spring wire and is generally frusto-conical in configuration having first end 202 of a first diameter and a second diameter 204 greater than the first diameter.

Figure 12:
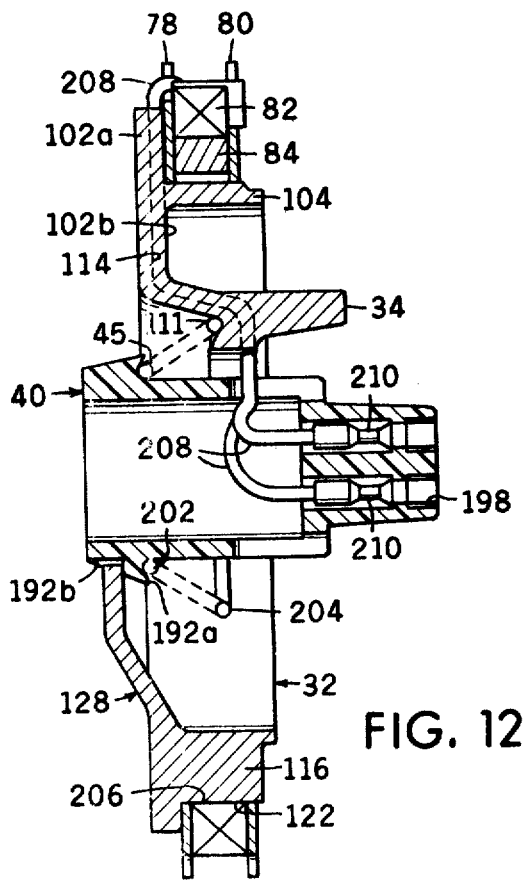
FIG. 12 is a cross-sectional side elevation of the mounting ring of this invention assembled for installation.

FIG. 12 illustrates stator mounting ring 32 carrying the first portion of the means generating the varying electrical signal including pole pieces 78, 80 having a plurality of magnets 84 annularly disposed therebetween about axial portion 104 between bosses 116. Coil 82 is annularly disposed about the magnets and between the pole pieces and engages ribs 122, 124 along the inner annular circumference 206 of coil 82. Coil 82 terminates in leads 208 which are directed to well known female terminals 210 positioned in receptacles 198 via impressions 114. Spring 45 engages ring lip portions 111 at second diameter 204 and engages connector lip portions 192a at the first diameter 202. In this manner, prior to installation, detents 192b are urged into engagement with extensions 126, 128.

Insert 36, as shown in FIG. 5 is mounted on and extends into axle 12 so that annular surface 134 including O-ring 186 engages bore 46 and flange 131 limits rightward movement of insert 36 as shown in FIG. 1. Cotter key 58 may be inserted through axle 12 to extend through slot 146 of insert 36. Electrical connection is made between first connector 38 and the logic system (not shown) via cable 42 and male terminals 162 are positioned for making electrical connection with female terminals 210. In this manner, insert 36 is mounted on an end of axle 12 for electrically connecting the insert to the antilock logic system (not shown) and for receiving and securing stator 32 in predetermined radial orientation therewith. Also, stator 32 as shown in FIG. 12, including the first portion of the signal generating means, may be mounted on the insert for securing the stator for limited relative movement with respect to rotor 28 when the rotor is threaded onto hub 54.

Operation

With the pre-assembled insert 36 mounted on axle 12 and having the appropriate anchor means 44 extending therefrom and electrical connections made therewith as the axle moves along an assembly line, pre-assembled stator ring 32 and its aforementioned associated parts including pole pieces 78, 80, magnets 84, coil 82 connected to terminals 210 and second electrical connector urged against extensions 126, 128 by spring 45, the assembly line personnel need only mount the pre-assembled stator assembly on the axle by means of radially orienting keys 112 with keyways 150 which automatically orients side-by-side female terminals 210 of second electrical connector 40 with side-by-side male terminals 162 of first electrical connector 38 so that extension 196 is accommodated by receptacle 156. Also, hooks 182, 184 are automatically oriented to slide through slots 195 whereby the hooks snap into position to engage inner base portion 194b thus anchoring the second connector 40 in electrical connection with first connector 38. Thus, resilient urging of detents 192b into engagement with extensions 126, 128 is no longer accomplished since such engagement is limited due to hooks 182, 184 engaging inner base portion 194b. Rotor 28 including hub cap 22 carrying ladder 76 annularly disposed therein for alignment with pole pieces 78, 80 is then threaded onto hub 54. Thus, sensor 26 is assembled effeciently due to quick assembly of pre-assembled stator and rotor components. Similarly, disassembly may be accomplished by first removing hub cap 22 from hub 54 then urging second connector 40 rightwardly as shown in FIG. 1 to relieve the engagement of hooks 182, 184 with inner base portion 194b. Then by inserting a force p-type tool into receptacle 189, hooks 182, 184 may be positioned to slide through slots 195 when connector 40 moves leftwardly as viewed in FIG. 1.

The foregoing describes a sensor assembly provided for quick assembly on an axle and a method therefore, and for disassembly when required so that an effective electrical/mechanical connection is accomplished in a single assembly operation upon engaging the stator with the insert.

Having thus described the invention in its best embodiment and mode of operation, that which is desired to be claimed by Letters Patent is:

1. In a vehicle wheel antilock system of the type including a wheel speed sensor, the sensor mounted on an axle adjacent at least one of the vehicle wheels, the sensor having a rotor and a stator and including a generally annular stator mounting ring carrying a first portion of a varying electrical signal generating means including a coil in cooperation with a second portion of the varying electrical signal generating means carried by the rotor, the improvement comprising:
   a. means formed on the stator mounting ring for mounting the ring on the axle in a predetermined radial orientation;
   b. means mounted on the axle for receiving the ring;
   c. electrical connector means for electrically interconnecting the ring and the means for receiving the ring; and
   d. means resiliently interconnecting the ring and at least one of the electrical connectors.

2. In a vehicle wheel antilock system of the type including a wheel speed sensor, the sensor mounted on an axle adjacent at least one of the vehicle wheels, the sensor having a rotor and a stator and including a generally annular stator mounting ring carrying a first portion of a varying electrical signal generating means including a coil in cooperation with a second portion of the varying electrical signal generating means carried by the rotor, the improvement comprising:
   a. means formed on the stator mounting ring for mounting the ring on the axle in a predetermined radial orientation;
   b. means mounted on the axle for receiving the ring;
   c. electrical connectors mounted on the ring and the means for receiving the ring;
   d. means anchoring the electrical connectors in relative electrical and mechanical connection; and
   e. means resiliently interconnecting the ring and at least one of the electrical connectors.

3. In a vehicle wheel antilock system of the type including a wheel speed sensor, the sensor mounted on an axle adjacent at least one of the vehicle wheels, the sensor having a rotor and a stator and including a generally annular stator mounting ring carrying a first portion of a varying electrical signal generating means in cooperation with a second portion of the varying electrical signal generating means carried by the rotor, the improvement comprising:
   a. means formed on the stator mounting ring for mounting the ring on the axle in a predetermined radial orientation;
   b. means mounted on the axle for receiving the ring including:
      1. a first electrical connector mounted in the means for receiving the ring;
   c. a second electrical connector mounted on the ring;
   d. means anchoring the first and second electrical connectors in relative electrical and mechanical connection; and
   e. means resiliently interconnecting the ring and the second electrical connector.

4. In a vehicle wheel antilock system of the type including a wheel speed sensor, the sensor mounted on an axle adjacent at least one of the vehicle wheels, the sensor having a rotor and a stator and including a generally annular stator mounting ring carrying a first portion of a varying electrical signal generating means in cooperation with a second portion of the varying electrical signal generating means carried by the rotor, the improvement comprising:
   a. means mounted on the axle for receiving the ring and including a first electrical connector;
   b. the stator ring also carrying a second electrical connector connected to the first portion of the signal generating means;
   c. means anchoring the first and second electrical connectors in mechanical and electrical connection; and
   d. resilient biasing means interposed between the second electrical connector and the ring.

5. A vehicle wheel brake antilock assembly comprising:
   a. a generally annular stator mounting ring including:
      1. a portion of a varying electrical signal generating means including a coil;
   b. means formed on the stator mounting ring for mounting the ring on an axle in a predetermined radial orientation;
   c. means mounted on the axle for receiving the ring;
   d. electrical connectors mounted on the ring and the means for receiving the ring;
   e. means anchoring the electrical connectors in relative electrical and mechanical connection; and
   f. means resiliently interconnecting the ring and at least one of the electrical connectors.

6. A vehicle wheel brake antilock assembly comprising:
   a. a generally annular stator mounting ring including:
      1. a portion of a varying electrical signal generating means;
   b. means provided on the ring for mounting the ring on an axle in a predetermined radial orientation;
   c. means mounted on the axle for receiving the ring including:
      1. a first electrical connector mounted in the means for receiving the ring;
   d. a second electrical connector mounted on the ring;
   e. means for anchoring the first and second electrical connectors in relative electrical and mechanical connection; and
   f. means for resiliently interconnecting the ring and the second electrical connector.

* * * * *